No. 885,074. PATENTED APR. 21, 1908.
H. B. NIDEVER.
EXERCISER.
APPLICATION FILED NOV. 30, 1907.
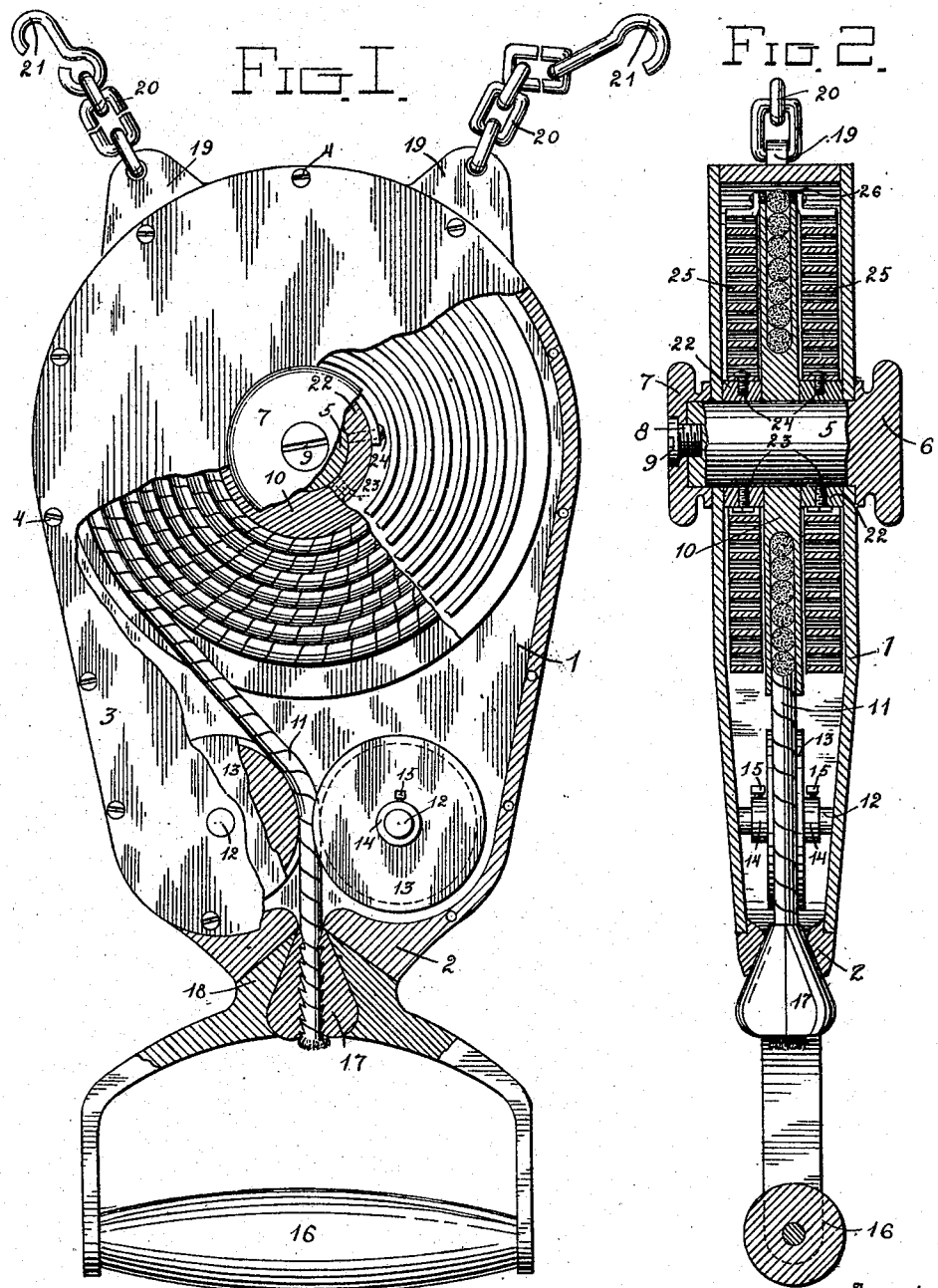

UNITED STATES PATENT OFFICE.

HENRY B. NIDEVER, OF MONTEREY, CALIFORNIA.

EXERCISER.

No. 885,074.  Specification of Letters Patent.  Patented April 21, 1908.

Application filed November 30, 1907. Serial No. 404,571.

*To all whom it may concern:*

Be it known that I, HENRY B. NIDEVER, a citizen of the United States, residing at Monterey, in the county of Monterey and State of California, have invented certain new and useful Improvements in Exercisers, of which the following is a specification.

My invention relates to exercisers and particularly contemplates the provision of an arm exercising device comprising a cord or rope wound upon a suitable reel and provided with a handle upon its free end adapted to be grasped by the operator to pull the same and unwind it from the reel, the reel being spring controlled to wind the cord or rope thereon again, and the two operations to be repeated alternately.

My invention further contemplates the provision of improved means for regulating the tension of the spring.

My invention further and specifically resides in the following features of construction, arrangement and operation to be hereinafter described with reference to the accompanying drawings, forming a part of this specification, in which like numerals are used to designate like parts throughout the several figures, and in which, Figure 1 is an elevation of my improved device, partly in section and partly broken away to show the interior mechanism, and Fig. 2 is a central vertical sectional view taken therethrough.

In the practical embodiment of my invention I provide a casing 1 having a reduced mouth 2 and a removable cover 3 fastened thereto by a plurality of screws 4. Mounted centrally and transversely through the casing 1 and its cover 3 is a shaft 5 having a flanged knob 6 integral therewith and resting outside of said casing, and having a removable knob 7 similarly formed and resting outside the cover 3 of said casing, said shaft being provided with a screw plug 8 threaded in the end thereof and having an enlarged head 9 bearing upon a portion of the removable knob 7, to force the same into tight engagement with the cover 3 of the casing and to draw the knob 6 into like engagement with the reverse side of the casing, thus locking the shaft 5 immovable. Mounted loosely, to rotate upon the shaft 5 is a reel 10 having an operating cord or rope 11 wound thereon and extending outside of the casing 1 through its contracted mouth 2. To guide the cord or rope 11 and prevent its binding within the casing 1 I mount two shafts 12 transversely through said casing adjacent its contracted mouth 2 and arrange upon its shafts guide rollers 13 having grooved peripheral faces traveling in close proximity to one another to receive the cord or rope 11 therethrough, and in alinement with the contracted mouth 2 of the casing 1 before the passage of said cord or rope through said mouth. The guide rollers 13 are preferably held in the same plane and against displacement by means of collars 14 clamped upon the shafts 12 on both sides of said rollers by said screws 15. The free end of the cord or rope 11 is carried within a handle 16 by means of a two part tapering internally toothed rope clamp 17 within a correspondingly tapering recess in said handle 16, said handle being provided with a tapering nose 18 adapted, when the device is not in use to rest within a correspondingly formed recess adjacent the contracted mouth 2 of the casing 1. The casing 1 is provided at its opposite end with a pair of integral projecting ears 19 having short chains 20 projecting therefrom and provided at their ends with hooked members 21 adapted to be secured upon a suitable support.

Mounted on the shaft 5 between the reel 10 and the sides of the casing 1 are a pair of collars 22, secured to said shaft by set-screws 23 and having, in turn, flat springs 25 coiled thereon and having their inner ends secured thereto by screws 24, said springs having their convolutions gradually enlarging to points adjacent the peripheral edges of the reel 10 and having their free ends twisted and flattened thereagainst and secured thereto by screws 26. Thus when the cord or rope 11 is pulled out of the casing 1 by means of its handle, and unwound from the reel 10 the spring 25 will be coiled up and will correspondingly expand, when said cord or rope is released, to rotate the reel 10 and thereby wind the cord or rope 11 up thereon until the tapering nose 18 of the handle 16 engages within the recess adjacent the contracted mouth 2 of the casing 1. Thus also, when the tension of the spring 25 has become impaired or it is desired to heighten the same, or should it be desired to reduce the tension of the same, the removable knob 7 of the shaft 5 is released from its locking engagement with the side of the casing 1 by unscrewing the plug 8 and the shaft 5 being thus released may be rotated in one direction or the other, or either tighten or loosen the tension of the spring 25, said shaft being again locked by tightening the screw plug 8 to clamp the removable knob 7 upon the casing, when the desired tension has been obtained.

Having thus fully described my invention, I claim:

1. In an exerciser of the character described, the combination of a casing, a shaft mounted therethrough, a reel loosely mounted upon said shaft, and carrying a suitable cord or rope thereon leading outwardly through said casing, a handle carried upon the outer end of said cord, a spring arranged within said casing having one end attached to said reel and its other end attached to said shaft, said shaft having enlarged knobs secured on the ends thereof outside, and abutting said casing, and means for causing said knobs to securely engage with and bind against said casing to hold the said shaft stationary, substantially as described.

2. In an exerciser of the character described, the combination of a casing, a shaft mounted therethrough, a reel loosely mounted upon said shaft and carrying a suitable cord or rope thereon leading outwardly from said casing, a handle carried upon the outer end of said cord, springs arranged within said casing at the sides of said reel and having one of their ends attached thereto, and their other ends attached to said shaft, said shaft being rotatable within said casing to tighten or loosen the tension of said springs and having enlarged knobs secured on the ends thereof, outside, and abutting said casing, and releasable means for causing said knobs to securely engage with and bind against said casing, to hold the said shaft stationary, substantially as described.

In testimony whereof I affix my signature in presence of witnesses.

HENRY B. NIDEVER.

Witnesses:
A. A. CHAINE,
E. K. ABBOTT,
C. V. HOVE.